(12) United States Patent
Schneider et al.

(10) Patent No.: US 6,919,891 B2
(45) Date of Patent: Jul. 19, 2005

(54) GENERIC PARAMETERIZATION FOR A SCENE GRAPH

(75) Inventors: Gerhard A. Schneider, Kirkland, WA (US); Joseph S. Beda, Seattle, WA (US); Adam M. Smith, Kirkland, WA (US); Kevin T. Gallo, Woodinville, WA (US); Ashraf A. Michail, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 362 days.

(21) Appl. No.: 10/184,796

(22) Filed: Jun. 27, 2002

(65) Prior Publication Data

US 2003/0132937 A1 Jul. 17, 2003

Related U.S. Application Data

(60) Provisional application No. 60/330,231, filed on Oct. 18, 2001.

(51) Int. Cl.$^7$ .............................................. G06T 11/20
(52) U.S. Cl. ....................... 345/440; 345/419; 345/473; 709/219; 715/500.1
(58) Field of Search ................................ 345/419, 473, 345/440; 715/500.1; 709/219

(56) References Cited

U.S. PATENT DOCUMENTS

| | | | | |
|---|---|---|---|---|
| 5,852,449 A | * | 12/1998 | Esslinger et al. | 345/473 |
| 6,215,495 B1 | * | 4/2001 | Grantham et al. | 345/419 |
| 6,487,565 B1 | * | 11/2002 | Schechter et al. | 715/500.1 |
| 6,751,655 B1 | * | 6/2004 | Deutsch et al. | 709/219 |

* cited by examiner

Primary Examiner—Kimbinh T. Nguyen
(74) Attorney, Agent, or Firm—Law Offices of Albert S. Michalik, PLLC

(57) ABSTRACT

A parameterized scene graph provides mutable (animated) values and parameterized graph containers such that an application program or the like can selectively change certain aspects of the scene graph description while leaving other aspects intact, and also reuse portions of the scene graph with different parameters. To this end, mutable values are provided, which provide the higher level code with hooks into the scene graph enabling the scene description to be changed. The mutable values may be varied over time to provide animation. A parameterized graph container is also described that enables a scene graph portion to be templatized for reuse throughout a scene in a generic way. In this manner, a single parameterized graph container may be efficiently reused in a scene graph, with different values for its parameters.

7 Claims, 11 Drawing Sheets

GENERIC PARAMETERIZATION FOR A SCENE GRAPH

CROSS-REFERENCE TO RELATED APPLICATIONS

The present invention claims priority to U.S. Provisional Patent Application Ser. No. 60/330,231, filed Oct. 18, 2001. The present invention is related to United States Patent Applications entitled "Multiple-Level Graphics Processing System and Method" and "Intelligent Caching Data Structure for Immediate Mode Graphics", both assigned to the assignee of the present application, filed concurrently herewith, and hereby incorporated by reference in their entireties.

FIELD OF THE INVENTION

The invention relates generally to computer systems, and more particularly to the processing of graphical and other video information for display on computer systems.

BACKGROUND OF THE INVENTION

In contemporary computing systems, the capability of graphics and video hardware is growing at a fast pace. In fact, to an extent, the graphics system in contemporary computing systems may be considered more of a coprocessor than a simple graphics subsystem. At the same time, consumers are expecting more and more quality in displayed images, whether viewing a monitor, television or cellular telephone display, for example. However, memory and bus speeds have not kept up with the advancements in main processors and/or graphics processors.

As a result, the limits of the traditional immediate mode model of accessing graphics on computer systems are being reached. At the same time, developers and consumers are demanding new features and special effects that cannot be met with traditional graphical windowing architectures.

Although certain game programs have been designed to take advantage of the graphics hardware, such game programs operate with different requirements than those of desktop application programs and the like, primarily in that the games do not need to be concerned with other programs that may be concurrently running. Unlike such game programs, applications need to share graphics and other system resources with other applications. They are not, however, generally written in a cooperative, machine-wide sharing model with respect to graphics processing.

For example, performing animation with desktop applications currently requires specialized single-purpose code, or the use of another application. Even then, achieving smooth animation in a multiple windowed environment is difficult if not impossible. In general, this is because accomplishing smooth, high-speed animation requires updating animation parameters and redrawing the scene (which requires traversing and drawing data structures) at a high frame rate, ideally at the hardware refresh rate of the graphics device. However, updating animation parameters and traversing and drawing the data structures that define a scene are generally computationally-intensive. The larger or more animate the scene, the greater the computational requirement, which limits the complexity of a scene that can be animated smoothly.

Compounding the problem is the requirement that each frame of the animation needs to be computed, drawn, and readied for presentation when the graphics hardware performs a display refresh. If the frame is not ready when required by the hardware, the result is a dropped or delayed frame. If enough frames are dropped, there is a noticeable stutter in the animated display. Also, if the frame preparation is not synchronized with the refresh rate, an undesirable effect known as tearing may occur. In practice, contemporary multi-tasking operating systems divide computational resources among the many tasks on the system. However, the amount of time given for frame processing by the operating system task scheduler will rarely align with the graphics hardware frame rate. Consequently, even when sufficient computational resources exist, the animation system may still miss frames due to scheduling problems. For example, an animation task may be scheduled to run too late, or it may get preempted before completing a frame, and not be rescheduled in time to provide a next frame for the next hardware refresh of the screen. These problems get even more complex if the animated graphics need to be composited with video or other sources of asynchronously generated frames.

In general, the current (e.g., WM_PAINT) model for preparing the frames requires too much data processing to keep up with the refresh rate when complex graphics effects (such as complex animation) are desired. As a result, when complex graphics effects are attempted with conventional models, instead of completing the changes in the next frame that result in the perceived visual effects in time for the next frame, the changes may be added over different frames, causing results that are visually and noticeably undesirable. There are computing models that attempt to allow the changes to be put in selectively, by providing object handles to every object in the scene graph. Such models, however, require applications to track a significant number of objects, and also consume far too many resources, as the object handles are present even when the application does not want to make changes to the objects.

In summary, existing models for controlling graphics are inadequate for handling complex graphics in an efficient manner. A new model for controlling graphics output is needed.

SUMMARY OF THE INVENTION

Briefly, the present invention provides a parameterized scene graph that represents graphics data to be rendered such that higher-level code (e.g., an application program) can selectively change certain aspects of the scene graph description while leaving other aspects intact. To this end, mutable values are provided, which provide the higher level code with generic hooks into the scene graph enabling the scene description to be changed without rebuilding the scene graph or implementing customized code. For example, the user can modify the color of a button in reaction to an application event like a mouse click without rebuilding the scene graph or a part of the scene graph, as would be necessary in a traditional scene graph. In addition to a relatively fixed image represented in the scene graph having its appearance characteristics changed by changing a parameter, other images can be animated by changing their appearance, size and/or position over time, i.e., mutable values may bind animation with the scene graph.

A parameterized graph container is also described that provides the concept of abstraction to a scene graph. In other words, a parameterized graph container enables a scene graph to be templatized for reuse throughout a scene in a generic way. In this manner, a single parameterized graph container may be efficiently reused in a scene graph, with different values for its parameters. For example, a single parameterized graph container representing a particular shape can result in numerous instances of that shape appearing at different positions in a frame, with various parameter values, such as color, size, angle and so forth. Such reuse enables a complex scene graph to be highly efficient in terms of the resources required to render a frame therefrom.

Because the parameterization is realized as intrinsic scene graph primitives, generic methods can be applied to optimize the rendering process, thereby enabling the scene graph to be used with efficient compiling and rendering mechanisms. Other benefits include efficient and flexible reuse of resources in a particular scene graph instance, robustness, and scalable changes, including a distinction between more-costly structural changes and highly efficient changes through the parameterization system.

The present invention may be provided via a system comprising a scene graph including a plurality of containers that when traversed provide instructions for outputting graphic data, at least one of the plurality of containers associated with a mutable value, the mutable value having a value that may be varied, and a rendering mechanism that traverses the scene graph and provides the instructions, the instructions including data based on a current value of the mutable value. A method and a computer-readable medium having computer-executable instructions may include providing an interface comprising a set of at least one function to a scene graph, receiving a request via the interface to include a mutable value in a container of the scene graph, the mutable value having a value that is capable of being varied by another request received via the interface, and rendering the scene graph including providing graphics instructions corresponding to the scene graph, the instructions including data based on a current value of the mutable value.

A system may include a scene graph including a plurality of containers that when traversed provide an set of instructions for outputting data, a parameterized graph container, the parameterized graph container corresponding to a set of at least one variable value that may be changed, and a rendering mechanism that traverses the scene graph, including taking action to determine an actual value for the variable value and place data corresponding to the actual value in the set of instructions. A method and computer-readable medium having computer-executable instructions may comprise providing a scene graph including an interface for adding containers thereto, receiving a request to add a parameterized graph container to the scene graph, the parameterized graph container representing content and corresponding to a set of at least one variable value that may be changed, and rendering an instruction stream from the scene graph, including determining a first actual value for each variable value in the set and placing first data corresponding to each first actual value in the instruction stream, and determining a second actual value for each variable value in the set and placing second data corresponding to each second actual value in the instruction stream.

A computer-readable medium having stored thereon a data structure may comprise a first field indicative of an instruction type corresponding to a graphics instruction in a parameterized instruction stream of a scene graph, at least one parameter field, each parameter field including a placeholder for a parameterized instruction, and upon rendering of the scene graph, the placeholder being instantiated into a constant value by obtaining the constant value from information corresponding to the scene graph. A method for communicating between a first process and a second process, may include at the first process, providing a scene graph including an interface for adding containers thereto, receiving, from the second process, a request to add a parameterized graph container to the scene graph, the parameterized graph container representing content and corresponding to a set of at least one variable value that may be changed, and at the first process, rendering an instruction stream from the scene graph, including determining a first actual value for each variable value in the set and placing first data corresponding to each first actual value in the instruction stream, and determining a second actual value for each variable value in the set and placing second data corresponding to each second actual value in the instruction stream.

Other benefits and advantages will become apparent from the following detailed description when taken in conjunction with the drawings, in which:

DETAILED DESCRIPTION

Exemplary Operating Environment

Figure 1:
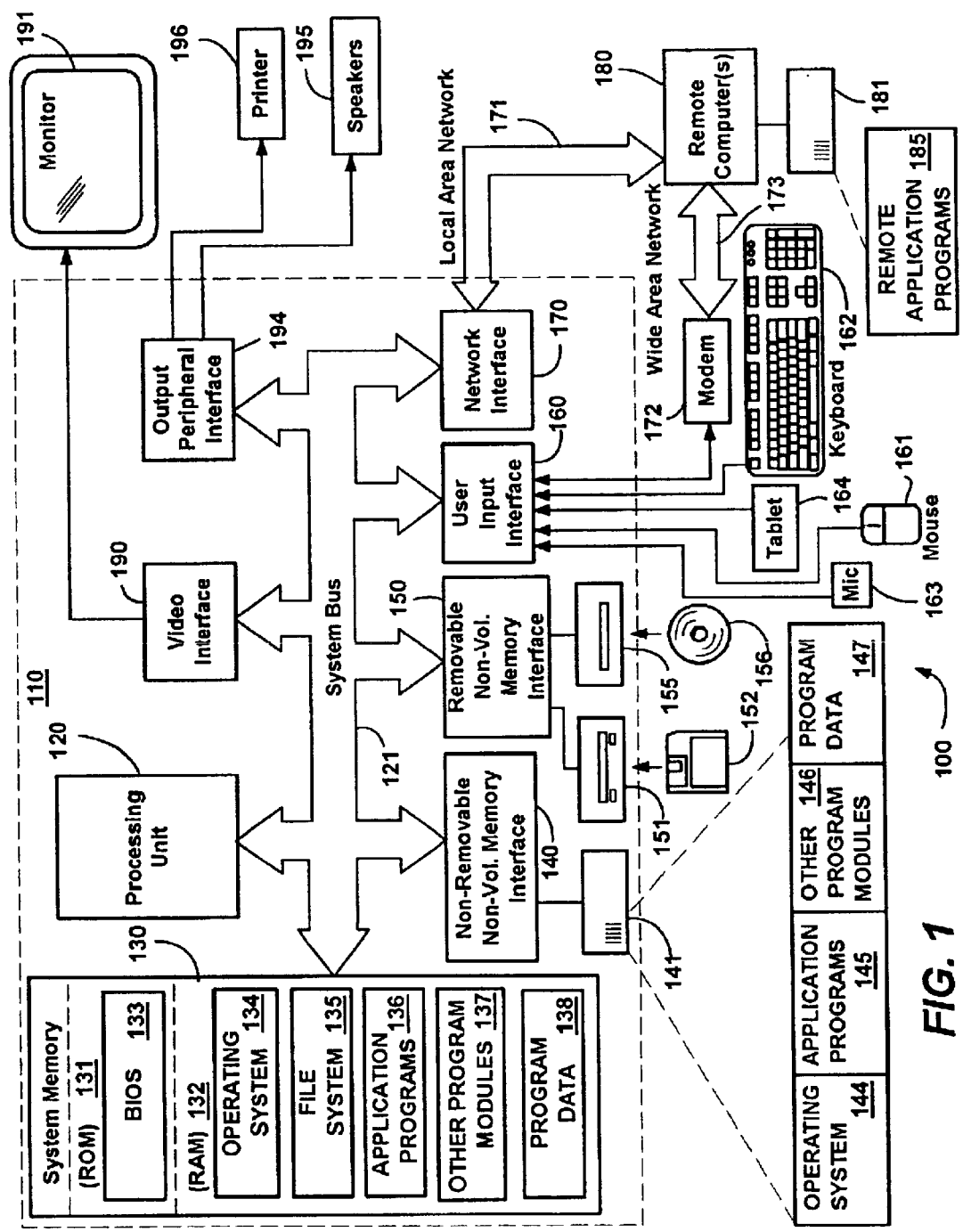
FIG. 1 is a block diagram representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Accelerated Graphics Port (AGP) bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 193 or the like that can input digitized input such as handwriting into the computer system 110 via an interface, such as a touch-screen interface 192. Note that the monitor and/or touch screen panel can be physically coupled to a housing in which the computing device 110 is incorporated, such as in a tablet-type personal computer, wherein the touch screen panel 193 essentially serves as the tablet 164. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Graphics Layer Architecture

Figure 2:
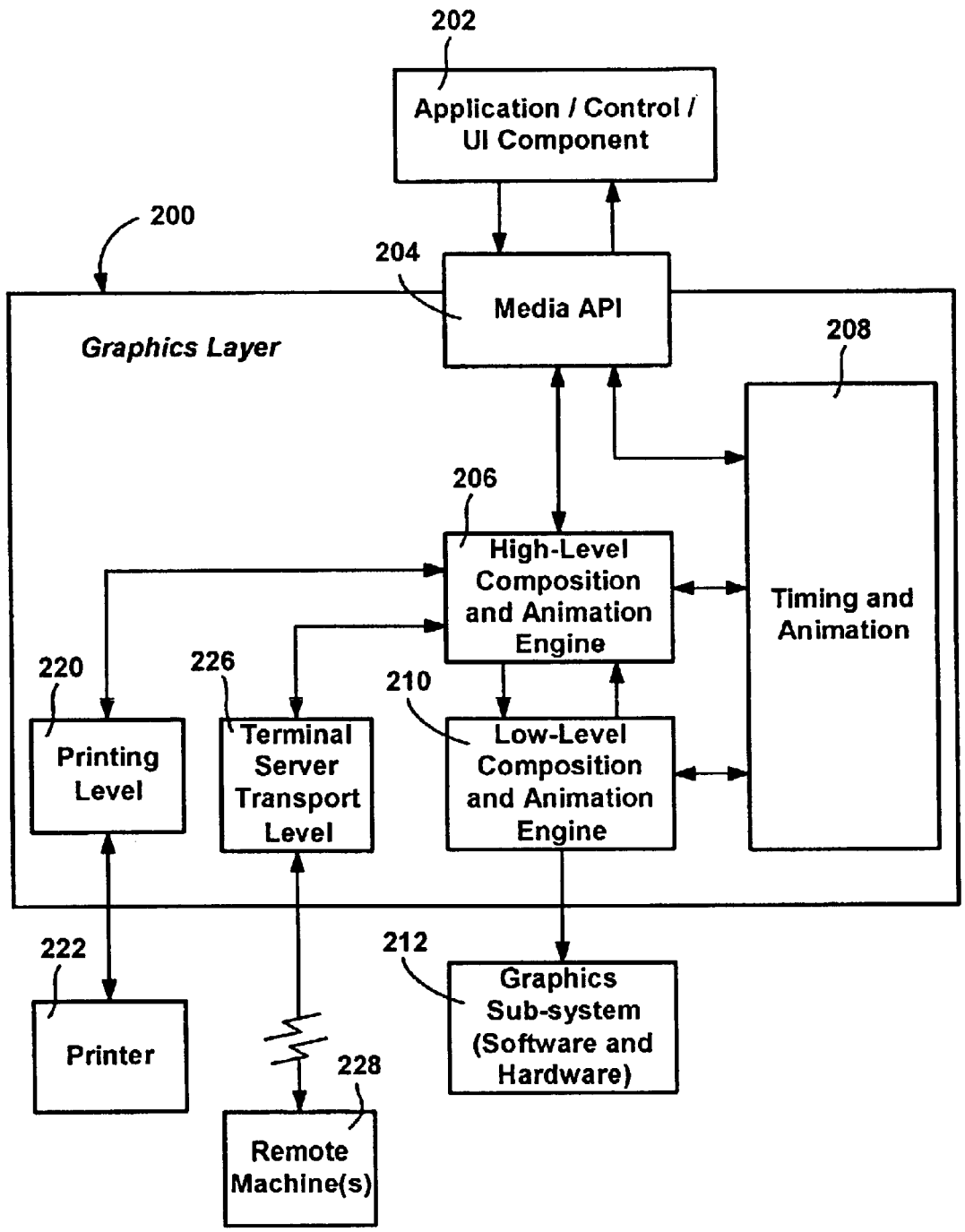
FIG. 2 is a block diagram generally representing a graphics layer architecture into which the present invention may be incorporated.

One aspect of the present invention is generally directed to easing the processing required for applications and other components to render complex graphics, including by leveraging more of the power of the graphics hardware that is present on typical computer systems. To this end, as generally presented in FIG. 2, in one computing environment into which the present invention may be incorporated, a graphics layer architecture (also referred to as a media integration layer) 200 is provided. An application, control or other similar higher-level program code (e.g., a user interface of an operating system component) 202 accesses the graphics layer architecture 200 via a set of application programming interfaces (APIs) 204 or the like, to access (write or read) graphical information. Note that although many of the examples described herein will refer to an application program interfacing with the APIs, it is understood that other higher-level program code and components (e.g., a user interface of the operating system) will also be able to interface with the lower-level components described herein. As such, any reference to such higher-level program code, whether referred to as an application program, user interface, and so on, should be considered equivalent.

It should be noted that for various reasons including security, the graphics layer 200 (which outputs graphics) is preferably incorporated into the operating system. For example, while feasible to allow some or part of the graphics layer 200 to be inserted between the application and the operating system, doing so would enable a malicious program to display whatever graphics it wanted, and thereby cause harm. For example, malicious code could display a dialog box requesting entry of a password to thereby steal a user's password. Other reasons for incorporating the graphics layer 200 into the operating system include stability and efficiency, e.g., the lower levels can efficiently trust that the data and instructions from the higher layers are already verified. Further, the lower levels can expose interfaces that only the operating system is trusted to call responsibly, that is, without exposing those interfaces to unpredictable programs, thereby ensuring greater stability.

In one implementation, the graphics layer architecture 200 includes a high-level composition and animation engine 206, timing and animation components 208, and a low-level compositing and animation engine 210. As used herein, the terms "high-level" and "low-level" are similar to those used in other computing scenarios, wherein in general, the lower a software component relative to higher components, the closer the component is to the hardware. Thus, for example, graphics information sent from the high-level composition and animation engine 206 may be received at the low-level compositing and animation engine 210, where the information is used to send graphics data to the graphics subsystem including the hardware.

As described below, the high-level composition and animation engine (also referred to herein as the high-level compositor and animator or the high-level engine or component) 206 builds a scene graph to represent a graphics scene provided by the application program 202, while the timing and animation components provide declarative (or other) animation and timing control. As also described below, the low-level compositing and animation engine (also referred to herein as the low-level compositor and animator or low-level engine or component) 210 composes the renderings for the scenes of multiple applications, and with rendering components, also referred to renderers, implement the actual rendering of graphics to the screen. Note, however, that at times it may be necessary and/or advantageous for some of the rendering to happen at higher levels. For example, while the lower layers service requests from multiple applications, the higher layers are instantiated on a per application basis, whereby is possible to do time consuming or application-specific rendering at a higher levels, and pass references to a bitmap to the lower layers.

In general, the high-level composition and animation engine 206 builds the display structure and traverses the structure creating rendering instructions and simple animation intervals to be passed to the low-level compositing and animation engine 210. The rendering instructions generated by the high level compositor may contain timing and animation information. The low-level compositing and animation engine 210 takes the rendering instructions and animation intervals and manages the animating, rendering and composing the scene that is then provided to the graphics subsystem (e.g., the graphics software and hardware) 212.

Alternatively or in addition to locally displayed output, the high-level composition and animation engine 206 (or one similar thereto) may provide the rendering and animation instructions in an appropriate format to lower-level printing code 220 for sending fixed image data to a printer 222 or the like, and/or may provide rendering instructions and simple animation intervals in an appropriate format to a lower-level terminal transport server 226 for transmission to remote machines 228. Note that richer information also may be passed across the network, e.g., it may be desirable to have the remote machine handle mouse rollover effects locally, without any network traffic.

Multiple Graphics Processing Levels

The graphics layer architecture 200 thus separates graphics processing into multiple levels. Each of these levels performs some intelligent graphics processing which together allows applications, user interfaces and the like 202 to output graphics with smooth animation, composite the graphics with the graphics of other applications and with video frames. The animation and/or compositing may also be synchronized with audio output. For example, by synchronizing audio with the frame rate at the low level component, the timing of audio can essentially be exact with that of video or graphics, and not dependent on the ability of task-scheduled, complex pre-processing to keep up with the refresh rate.

Figure 3:
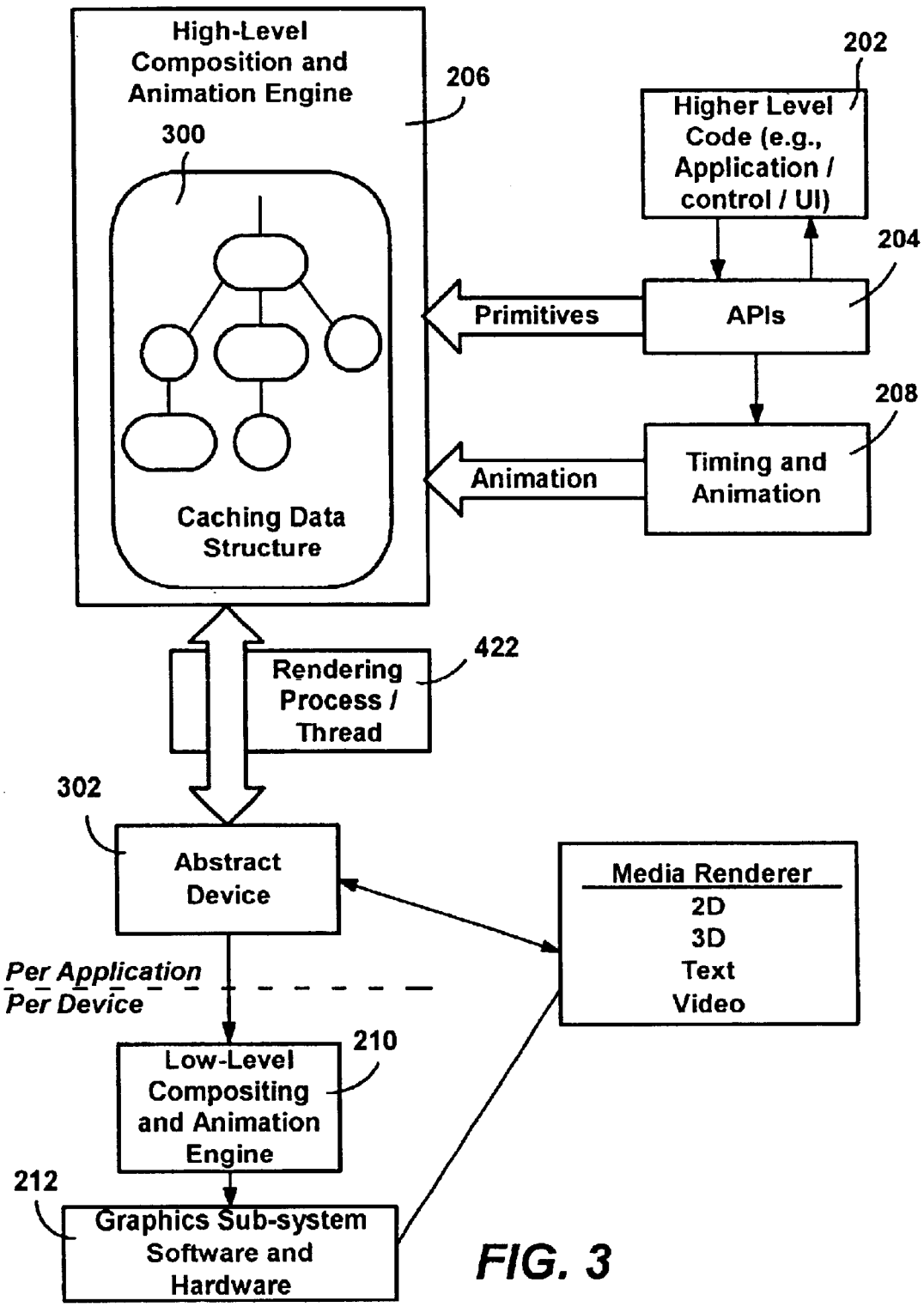
FIG. 3 is a block diagram generally representing an intelligent caching data structure and its relationship to various components in a graphics layer architecture such as in FIG. 2.

As generally represented in FIG. 3, below the application 202 as communicated with via the APIs 204, the high-level compositor and animator engine 206 caches the application graphical data in a graph structure 300, pre-processes the data in an intelligent manner, and performs numerous other operations to facilitate the output of complex graphics. In general, the high-level compositor and animator engine 206 performs complex processing (sometimes referred to as compiling) that significantly simplifies the amount of processing and significantly reduces the amount of data that lower levels need to deal with to render the correct output. Note, however, that the amount and type of processing that is performed by the higher level may be dependent to a significant extent on the load, configuration and capabilities of the lower levels. For example, if high capability graphics hardware is present, the higher level may do a lesser amount of processing, and vice-versa. The high-level and low-level layers are adaptive to these factors.

As also described in the aforementioned U.S. Patent Application "Multiple-Level Graphics Processing System and Method," the high-level composition and animation engine 206 can accomplish such complex processing without overwhelming the available system resources because it operates at a relatively slower rate than the level or levels below. By way of example, and not limitation, the lower levels may operate at the frame (refresh) rate of the hardware graphics processor. For example, the high-level compositor and animator 206 may only operate when needed to effect a display change, on demand, or on another schedule (e.g., every half second). Note that while a single high-level compositor and animator engine 206 is represented in FIG. 3, there may be multiple instances of them, such as one per application, while there is typically only one low-level compositing and animation engine 210 per graphics device, e.g., one for each graphics hardware card on a machine.

Moreover, the high-level compositor and animator 206 can tailor its output to (or be designed to output) a format of the appropriate level or levels below, e.g., essentially any abstract device 302. For example, the high-level compositor and animator 206 can produce compiled output that is ultimately destined for a printer, for transmission over a network to a number of remote terminals for display thereon, or, as will be primarily described herein, for a lower-level compositor and animator 210 that is present above local graphics software and hardware 212. A single high-level compositor and animator may process the output of an application for a plurality of abstract devices, or there may be a suitable instance of a high-level compositor and animator to process the output of an application for each type of abstract device, e.g., one for local graphics, one for a printer and one for a terminal server.

Further, the commands and other data provided by the high-level compositor and animator 206 can be simplified to match the capabilities and requirements of the hardware, e.g., the lesser the hardware, the more high-level pre-processing needed. Still further, the amount of high-level pre-processing may be dynamic, e.g., so as to adjust to the varying processing demands placed on the lower level or levels.

For local graphics output, in one configuration the graphics layer architecture 200 includes the high-level compositor and animator 206, and the low-level compositor and animator 210. In general, the high-level compositor and animator 206 performs complex processing of graphics information received from clients (e.g., applications) to build graphics structures and convert these structures into a stream of graphics commands. The low-level engine 210 then uses the streams of graphics commands from various clients to compose the desktop that is viewed by the computer user, e.g., the low-level compositor composes the desktop by combining the command streams emitted by the various clients present on the desktop into graphics commands consumed by a graphics compositing engine.

In this implementation, the high-level compositor and animator 206 performs the complex processing operations that build and convert the structures 300 into the stream of graphics commands at a rate that is normally much slower than the hardware refresh rate of the graphics hardware of the graphics subsystem 212. As a result of this high-level pre-processing, the low-level engine 210 is able to perform its own processing operations within the hardware refresh interval of the graphics hardware of the graphics subsystem 212. As mentioned above, however, the low-level engine 210 can communicate back to the high-level engine 206 over a back channel so that the high-level pre-processing can dynamically adjust to the low-level processing demands. Note that the back-channel from the low-level compositor and animator 206 to the high-level compositor and animator 206 is primarily for communicating flow control (the low-level engine 210 signaling it needs more data or is receiving too much) to the high level engine 206 and/or error conditions actionable by the high level engine 206. One advantage of such communication is that the low-level compositing and animation engine 210 need not be concerned with priorities or scheduling, but can remain in synchronization with the refresh rate. Instead, the high-level CPU process scheduling already present in contemporary operating systems will control priority. Thus, for example, if an application process attempts to take too much of its share of high-level graphics pre-processing relative to its priority, it will be that application that is adversely affected in its output. Note, however, that when the low-level system is under heavy load, it can choose to prioritize the changes and demands of one process/ high-level component over another. For example, the foreground application can be given priority.

The High-Level Compositor and Animator

The graphics layer 200 including the high-level compositor and animator 206 adjusts for hardware differences on a given machine, because each user application cannot realistically be written to handle the many types and variations of graphics hardware. However, applications may also contribute to the improved graphics processing provided by the graphics layer 200, namely by providing more (and different) information to the high-level compositor and animator 206 than that presently passed to an operating system's graphics APIs. For example, applications that are aware of the graphics layer 200 may provide different data, including animation intentions and the like via the graphics layer APIs 202. By way of example, instead of performing animation by continually redrawing a slightly varied image, the application can provide an instruction as to how a particular image should move over time, e.g., relative to a fixed background. The graphics layer 200 then handles the automation in a smoothly rendered way, as generally described below.

As also described below, the application 204 may request via API calls that a scene graph include variable data that the application can adjust via parameters, referred to as mutable values. For example, the application can selectively control the color, size, position and so forth of rendered content that is represented by a subgraph in the scene graph. Also, the application can request via API calls that a scene graph include reusable portions having different variable values, if desired, which will be implemented in the scene graph via a parameterized graph container.

Figure 4:
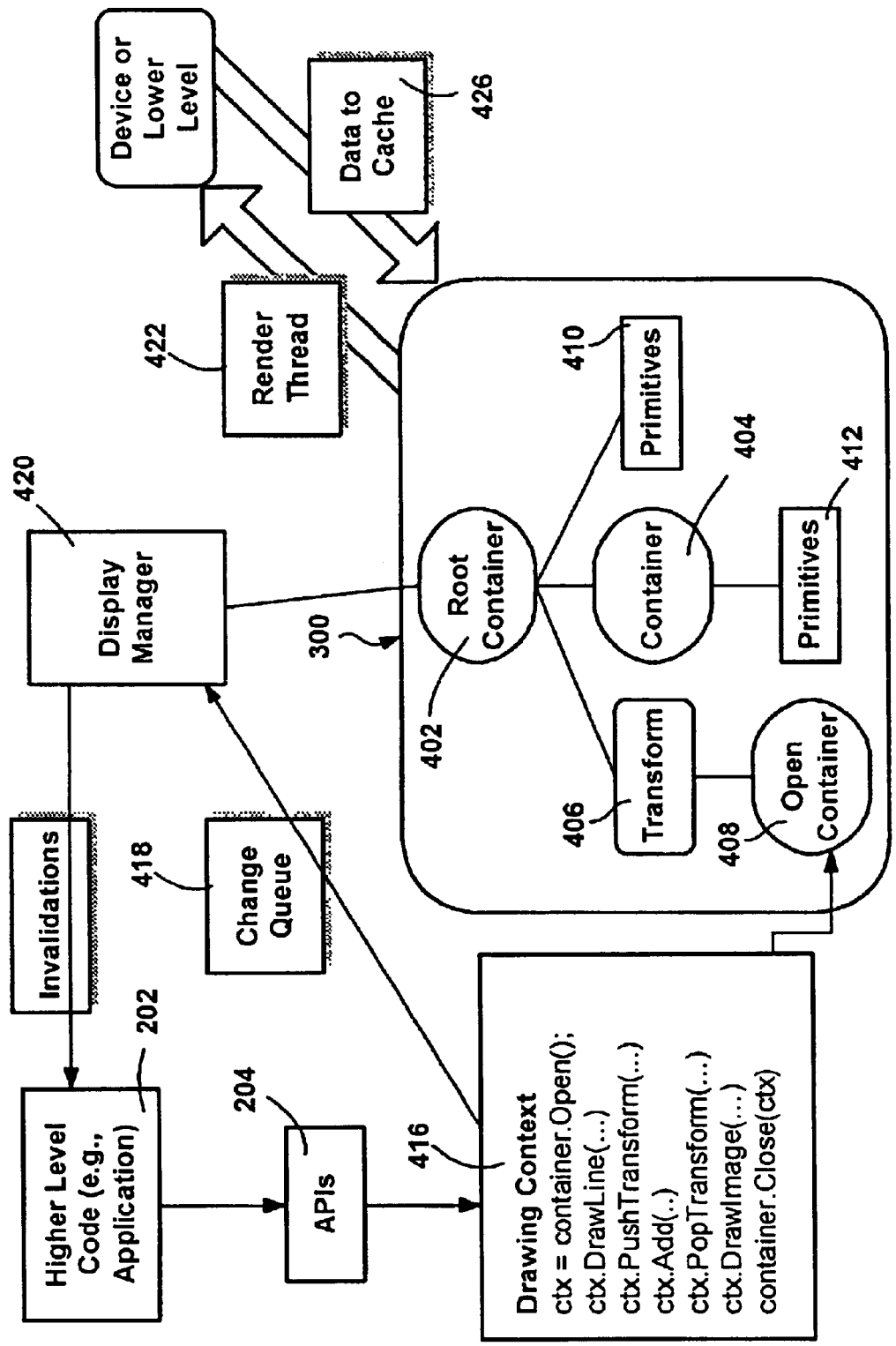
FIG. 4 is a block diagram representing a general flow of control between a high-level composition and animation engine and other levels in a graphics layer architecture such as in FIG. 2.

In general, as represented in FIGS. 3 and 4, the application 202 builds a scene graph data structure via APIs 204. The data includes high level structure and primitive data, and is put into a cache data structure 300 that is used to intelligently cache visual information.

One of the objects (or structures) in the overall intelligent caching data structure 300 is a container, represented in FIG. 4 by containers 402, 404 or 408, (alternatively referred to as a Visual2D). A container (e.g., 404) provides identity in that an application can hold a handle to it, and includes procedural parameters which can be used for hooking up animation and templating, hit-testing and user data. Note however that the containers represented herein are not the only types of containers that might be exposed. Other examples may include containers that are optimized for storing lines in a paragraph or for storing many children in a grid. Children containers may be added and removed without clearing the current list of children, although certain types of containers may not allow random access to the children. The structure exposed through the API can be adapted as needed.

Other (internal) nodes of this data structure include transforms 406, alpha nodes, cache nodes, and primitive nodes 410, 412, used to store internal data not directly associated with an API container. Primitives are generally stored as a stream of instructions that can be passed directly to the graphics device.

Figure 5:
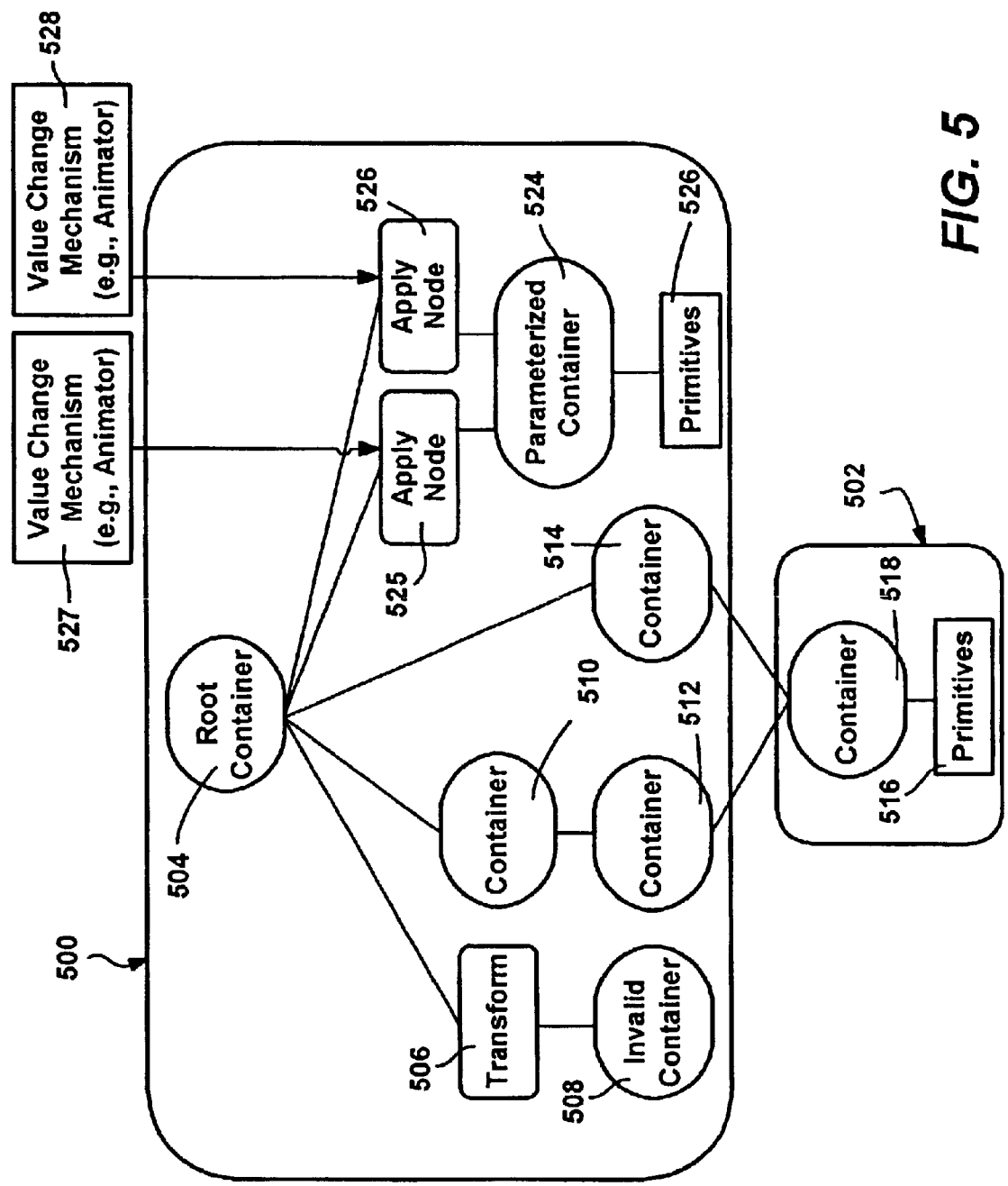
FIG. 5 is a block diagram representing example containers and other nodes cached in a simple data structure and their relationships in accordance with one aspect of the present invention.

As represented in the graph segment 500 of FIG. 5, a container such as 510 can thus hold other containers 512 or drawing primitives 516, wherein storage of the primitives inside of any container can be considered a stream of graphics instructions. A container can also store other containers, in effect creating a graph, i.e., containers can be referenced by more than one container so that the data structure is a directed acyclic graph (DAG) of containers and lists of primitives (wherein no container can contain one of its parent containers).

A container is populated via an open/close pattern, such as generally represented in the drawing context 416 of FIG. 4. More particularly, the higher level code 202 opens a container 408 in the data structure, provides the drawing context 416 (e.g., as a temporary object) to write drawing primitives and/or add other containers into the data structure, and then closes the container 408. In one alternative implementation, when the container is closed, its data is put into a change queue 418 that is then applied at some later time. The opening and closing of containers is one of the main mechanisms for changing the data structure. Note that other usage patterns may be employed, particularly for different types of containers.

In this alternative, because the changes to the data structure are put into a queue, a transaction-like (or batch-like) system for updating the data structure is enabled. As a result, when opening and writing to a container, no changes are apparent on the screen until the container is closed. The changes to the screen are atomic and there are no temporal artifacts (also referred to as structural tearing) of a partially drawn screen. Further, such transactional behavior can be extended so that changes to multiple containers are applied at once. In this way the higher level code 202 can set up many changes to a scene and apply those changes all at once.

In one alternative implementation, changes to the data structure are made asynchronously by posting changes to the queue 418 via a display manager 420, such that the changes will be processed on a rendering thread 422, and for example, sent to the low level compositor and animator 210, (wherein the abstract device 302 of FIG. 3 comprises the abstraction that encapsulates the conversion of rendering commands issued by the high level compositor 206 into rendering commands streamed to the low level compositor 210). The transaction-like model also enables modifications to the data structure to be made without interrupting reading from the data structure.

Although the above-described queue model enables the read passes from the high-level engine 206 to run independent of any actions that the user takes, user applications need the cache to maintain a consistent view of the APIs, which may lead to inefficiencies. By way of example, consider a user application on the main user thread setting a property on a container (object in the high-level engine 206). In the queue model, this property gets put into a queue to be applied to the high-level engine 206 data structure. However, if the user application tries to immediately read back that property from the container, the system will need to read the property back based on what is currently in the queue (which is inefficient), synchronize with the rendering thread and apply the pending changes in the queue (which is inefficient and would negate the benefits of having the queue), or keep copies of user changeable data, both the render version and the pending version, on the container (which is an inefficient use of memory).

Because there may be a considerable amount of reading back by applications, an alternative implementation essentially eliminates the queue by synchronizing the updating of the high-level engine 206 data structures and the main user thread. Although this enables the user application to freeze the rendering, the overall system is more efficient. However, to mitigate the perceived effects of possible freezing, various parts of the animation and timing system may be run independently to communicate information down to the low-level engine 210, while trusting the low-level engine 210 to do more animation processing independent of the high-level engine 206. Then, if the high-level engine 206 is frozen because of a user action, the output to the screen will still be relatively smooth and consistent.

Yet another alternative is to eliminate the render thread, and have the main user thread perform any processing necessary for the high-level engine 206 to pass the rendering instructions to the low-level engine 210. This is a more efficient use of threads in some cases.

Returning to FIG. 4, the container 408 comprises a basic identity node that contains drawing primitives, while the draw context 416 comprises a graph builder (e.g., a helper object) obtained from a container that can be used to add primitives, transforms, clips or other drawing operations to the container. The display manager 420 comprises a hosting object that represents an instance of the high-level compositor and animator 206, and for example, can attach to an hwnd (handle to a window) or an hvisual (handle to a visual container). The display manager 420 has a pointer to the root container 402 for the scene, dispatches events to the high level code when containers are invalid and need to be redrawn, and provides access to services such as hit testing and coordinate transforms.

In keeping with the present invention and as described below, the higher level code 202 can hold a handle or the like to some of the objects in the data structure and containers to enable changes to the scene graph via parameterization.

However, it should be noted that in a typical scene graph, most of the objects in the container do not have an identity from the perspective of the application. In particular, access to this structure is restricted in that most usage patterns are "write only." By limiting identity in this manner, more of the information stored in the data structure can be optimized, and the higher level code 202 does not have to store object information or deal with managing the objects' lifetimes.

For example, the resources that maintain part of the graph that is not needed (e.g., corresponds to visual information that has been clipped or scrolled off the screen) may be reclaimed, with the application requested to redraw the scene if later needed. Thus, generally when a container is opened its contents are cleared and forgotten. If those contents do not have identity, then they may safely disappear so that the resources for them can be reclaimed by the system. If the higher level code 202 or some other part of the graph is holding on to child containers, those containers stay around and can be reinserted. However, this pattern can be changed and adapted depending on the needs of the higher level code 202.

Thus, to summarize, the container is an object that has identity in that the high level code using the data structure can hold a handle to that object. The opposite of an object with identity is plain data, and while the user code may employ a mental model that treats the data without identity as an object, once this data is committed to the system there is no way to later reference that object. In this manner, the object can be transformed and changed in ways that are convenient to the system.

As a simplified example, an API function for drawing a line of text might include a TextLine object. The user of this object would prime the TextLine object with the actual text to be drawn, along with the other information on how to render different runs of that text (font, size, brush, and so forth). When the user program code wants to actually add that line of text to the data structure, the program code may take a drawing context for a particular open node, and pass the TextLine object into a drawing function on the drawing context. The system in effect takes the data that is in that TextLine object and copies the data into the data structure. Because this data does not have identity, the high-level compositor and animator engine 206 is free to take the contents of that line, run algorithms (e.g., OpenType) to break the text down to glyphs with positions, and store the positioned glyph data instead of the raw text. After that line was drawn the system would have no reference to the TextLine object that was used to draw the line, i.e., the data that the system stores does not have any identity.

Alternatively, the higher level code 202 may request that identity be preserved on that TextLine object, requiring the storing of a reference to that object in the data structure. In this manner, if the higher level code 202 later changes the TextLine object, the system will discover that change and reflect it in the rendered output. Note that in a more realistic example, identity would not be exposed on the text line object itself, but rather the application would hold a handle to a container and make changes as desired by parameterizing that container, as described below. Nevertheless, one of the main aspects of the data structure is to reduce the need for the higher level code 202 to create such objects with identity, whereby a reduced number of points in the data structure will be referenced by the controlling code 202. This enables more optimization of the data structure.

For example, because of the reduction in the amount of identity exposed outside of the data structure, an optimization such as the dense storage of primitives is enabled. To this end, vector graphic data is stored in a "primitive list" or primitive container. These containers are implementation specific and are not exposed with identity to the higher-level code 202. When the caller writes data into a container, that data is either stored in separate objects that are linked in, like the containers, (e.g., with transforms), or can be streamed into a packed and flattened data array. This array may not only store the vector graphic data in a compact way, but may also track the resources that go along with those primitives. Because the individual primitives do not have identity, there is no need to separate the primitives out or provide a way for the user to change those primitives later, enabling more efficient storage of the primitives.

As another optimization, when a subgraph is not changing, it is possible to store a bitmap of the contents of that subgraph, and attach the bitmap to a container, thereby reducing the amount of high-level processing needed. Further, when a subgraph or part of a primitive list requires significant processing before it can be passed to a lower-level code for rendering, (e.g. tessellation of vector graphics before being handed off to a hardware device), the post-processed result may be cached for later reuse.

Moreover, since there is no exposure of the structure except for specific read operations (described below), the data structure is free to reorganize containers so long as the rendered result is the same. A container may therefore store the child containers in a space partitioning tree to optimize rendering and other read operations. Further, the data structure may be displayed multiple times on the same device or on multiple devices. For this reason the caches may be keyed based on device if they are device dependent. If a subgraph is recognized as being static, repainted often because of animations around it and yet is dense enough to warrant the resource drain, a cache node may be automatically inserted for that sub-graph.

For rendering, the data structure is read (either at some scheduled time or by a different thread) and processed information of some form is passed to the lower-level animator and compositor 210. To this end, in one alternative implementation, a render object and thread (per process) 422 traverses the data structure 300 to drive the render process. In another alternative, instead of running on its own thread, the render process may share time on a common thread with the rest of the user's code in a type of "cooperative multi-tasking" arrangement. The data structure 300 can be used for direct rendering, although preferably it is compiled into the visual information that is fed to the lower-level components for very fast compositing and animation. The data structure 300 can also be compiled in different ways, such as to be sent across a network to a remote terminal, to a printer and/or serialized to disk or some other more permanent storage medium for interchange or caching.

In one alternative implementation, the data structure 300 is read for rendering on another thread 422. However, it should be noted that the use of another thread is not a requirement, e.g., the "render thread" may alternatively comprise a cooperative sharing mechanism that runs on the same thread as everything else.

In the alternative model that uses a rendering process/thread, the rendering thread runs as needed to provide the intended effect. Each time the thread runs, it first applies any pending changes that are in the change queue 418. The render thread 422 then walks the data structure 300 to collect information such as bounding boxes and collect invalidations (described below). Lastly it walks the areas that have changed since last time or need to be rendered for some other reason, and executes the rendering instructions that are stored in the data structure. Note that in the alternative model that does not use the change queue, changes are applied directly, as they are being made, and thus do not need to be applied here.

Thus, rendering from the data structure 300 may comprise a multiple pass process which may run on a separate render thread 422, including a pass that applies queued changes made to the data structure, a pass that pre-computes including iterating the data structure and computing data required for rendering such as bounding boxes, animated parameter values, and so forth, and a render pass. The render pass renders using the abstract device 302 that will ultimately delegate to the low-level compositor and animator 210. During the render pass, intermediate cached resources 426 can be cached in order to improve rendering performance on subsequent frames.

Possible results of the last walk of the data structure include that the data is executed directly and displayed on the screen, or executed on a back buffer that is flipped at the end of the last walk. Other results include the data being brought together with extended timing and animation information (as described in the aforementioned U.S. Patent Application entitled "Multiple-Level Graphics Processing System and Method") and passed down to a rendering thread/process that runs much more frequently. The walk may also result in data being executed onto a bitmap for a screen capture or other reasons, directed to a printer, or directed across a network and then used for any of the previous reasons on the remote machine. A combination of these results is also possible.

As can be appreciated, storage of the data in the data structure 300 may require a large amount of memory. Further, much of the data in the data structure 300 may not be needed because it is not visible, due to clipping, scrolling or other reasons. To reduce resource demand, the data structure 300 can be built on demand. To enable this, there is provided a method for calling back to the higher level code 202 in order to create portions of the data structure 300 as needed. This method has been referred to as "invalidation" and is similar to the WM_PAINT callback method used in conventional graphics systems, but applies to the structure 300 and cached contents instead of applying directly to bits on the screen. However, in one queue model alternative, read operations (like hit testing and coordinate transformation, described below) apply changes first, so the model presented to the user is synchronous.

Containers can be made invalid when they are created, when content is thrown away by the system because of low resources, or when the higher level code directly requests for the container to be made invalid. For example, the higher level code 202 can create a container, and provide a graphical size defining where and how big that container is to be. During a render operation, if that container was marked as invalid but is now determined to be needed, the render thread 422 will ask the higher level code 202 to fill in the container. The render thread 422 can wait for the higher level code 202 to complete the request, or continue the render without the data that is needed. The first option is not ideal, but may be necessary under some circumstances.

When the data is eventually filled in, the render thread 422 will run again to display those new changes. In one current implementation, the request to fill in a container is placed in another queue to get back to the thread running the higher-level code 202. However this may be done other ways, including a synchronous call to the higher level code 202 on the same thread on which the renderer is running. However, making any such call synchronous will stall the rendering thread.

In addition to queuing updates to the data structure 300, there is a need to provide for services to read back from the data structure 300. Such services include hit testing, point transformations and subgraph sizing.

Hit testing is a process whereby a point is given in the coordinate space of some root of the data structure, and the data structure is probed such that the containers or primitives that are hit by that point are returned. In a current implementation, the hit testing process is controlled by the values of three flags stored on each container, (although additional flags are feasible). A first flag includes a setting that instructs the hit test algorithm to stop and return the hit test results collected thus far. A second flag includes a setting that tells the hit testing algorithm to include that container in the result list if the point being hit does indeed hit that container. A third flag controls whether or the children of that container should be hit tested against.

Another read service is point transformation, wherein given two nodes connected through the graph, there is a service whereby a point in the coordinate frame of one container can be converted to the coordinate frame of another container (transforming coordinate systems). There are three general subtypes, including transforming from an ancestor to a descendent, from a descendent to an ancestor and from peer to peer (any arbitrary node to any other arbitrary node). The read service thus provides a way to query the data structure for coordinate transforms, and leverages the graph architecture to walk up and compute the transform. Animation/changes may be locked while doing multiple transforms, and performing transforms through a common ancestor may be provided.

Another read service is subgraph sizing. Given a node, this service returns the graphical size of that node and its subgraph. This may be in the form of a size that is guaranteed to be large enough to contain the subgraph, some perhaps different size that is just large enough to contain the subgraph, or a more complex shape detailing the contours of the subgraph.

An implementation may want to synchronize these read operations with changes to the data structure. To this end, if the change queue is applied before any of these read operations are called, a more consistent view is presented to the higher level code.

Generic Parameterization for a Scene Graph

In accordance with aspects of the present invention, a parameterized scene graph is provided that allows high-level program code 202 such as an application program the ability to efficiently use and manipulate scene graph components in a generic way. Unlike a conventional scene graph, which is a structured representation of a graphics image that is rebuilt when a scene is changed, a parameterized scene graph allows certain data structures to be changed after the graph structure has been built, without changing the scene graph structure, or implementing customized code. Also, a parameterized scene graph enables parts of the graph to be reused, with possibly different parameter values.

To this end, as generally described below, a parameterized scene graph includes parameterized instructions/primitives, parameterized specialized nodes (e.g. mutable transform containers, mutable alpha containers and so forth) and parameterized graph-nodes/containers. For example, the parameterized scene graph of the present invention provides mutable values, which are mechanisms for parameterizing a scene graph, and parameterized graph containers, which are containers capable of being reused in the scene graph.

A "mutable value" comprises a programmable entity in a parameterized scene graph that is able to affect rendering of the scene graph after the graph structure itself has been built. The inclusion of a mutable value provides a way to change information in the scene graph without changing the structure of the scene graph, which is highly efficient and provides a high performance model. In general, mutable values provide the user with hooks into the scene graph to change and otherwise control certain aspects of the scene description, without having to rebuild the scene graph structure. For example, the user can modify the color of a button in reaction to an application event like a mouse click, and/or change the appearance and/or position of an image on demand or over time. Thus, mutable values also bind animation with the scene graph.

A parameterized graph container 524 (FIG. 5) is also provided, which extends an ordinary scene graph with the concept of abstraction, thereby, for example, enabling parts of a scene graph to be reused with varying parameter values. In other words, parameterized graph containers enable a scene graph to be templatized for reuse in a generic way. Apply nodes 525, 526 control the parameters, as instructed by value change mechanisms (e.g., animators and/or a manually controlled process) 527, 528.

As described above and in the aforementioned patent application entitled "Intelligent Caching Data Structure for Immediate Mode Graphics," a temporary object referred to as a drawing context may be used to build the scene graph structure. The following table, (written in a C#-like pseudocode) provides an example drawing context (although it should be noted that the examples herein are simplified examples, not actual APIs which will allow the use of mutable values, as described below):

```
public class DrawingContext
{
    ...
    public void DrawLine (object color,
                         object fromPoint,
                         object toPoint,
                         object width);
    ...
}
```

A drawing context is usually obtained from a GraphContainer by calling an Open( ) function on the GraphContainer structure, as described in the example in the following table:

```
GraphContainer dv = new GraphContainer (...) ;
DrawingContext ctx = dv.Open( ) ;
```

The drawing context operations, which are one possible way to build a scene graph, are used to populate the graph container as set forth in the following example table:

```
ctx.DrawLine (new Color (...), new Point (...), new Point (...),
   1.0f);
ctx.PushTransform (...);
ctx.DrawLine (...);
ctx.PopTransform ( );
```

As described above, a transaction-like model is preferably provided, such that the operations do not take effect until the opened container is closed, for example, via a "dv.Close( );" function. To this end, the intelligent cache described above provides a transactioned system that builds and modifies the scene graph structure without intermediate scenes being rendered. To synchronize changes of animated values with graph modifications, changes to an animated value are similarly handled, that is, by sending changes to an animated value through the change queue 418 (FIG. 4) or equivalent. Note that asynchronously building is only one possible solution. For example, the scene graph may be synchronously built by locking the scene graph while being changed, which may lead to problems with erratic animation or redrawing if the updates are too slow, but prevents structural tearing.

Mutable values thus provide the user with a means to hook changeable entities in the scene graph. Their configuration enables animation to be bound into the system.

A mutable value itself is a programmable entity (such as an abstract class), as set forth in the example table below:

```
public class MutableValue
{
    internal MutableValue (Type type);
    internal abstract object GetValue ( );
    internal Type GetType ( );
    private Type type;
}
```

A Mutable Value provides functions, including GetValue, which returns the current value of the mutable value object. This function needs to be overridden by each subclass. The function GetType is used to determine the type (e.g., indicating that the parameter represents a color) of the current value stored in the mutable value, which is determined during construction of a particular mutable value and in one present implementation cannot change. Any derived class calls the mutable value constructor, accessed via an API, and pass in the type of the mutable value, whereby the constructor will store the type of the mutable value in the private type field.

An animated value is one example of a kind of mutable value that a user can create. An animated value can be used with any drawing operation. The calling code creates an instance of animated value (e.g., AnimatedColor) by simply constructing one. In this way the primitive APIs (e.g. DrawLine) are type safe. During construction, an animation fragment is passed to the constructor API to describe how the animation value changes its value over time. Other kinds of mutable values may be created, e.g., a StaticMutableValue that encapsulates a constant value (and is thus not actually mutable, but makes the API more straightforward). There are also mutable values for expressions, for binding into higher-level systems and for use with templating.

The following is a general example explaining the animation system, (although it is not an actual API). Note that the animation system is not necessary to the present invention, but is described herein because an implementation of the parameterized scene graph is arranged to work with this animation system.

```
public class AnimatedValue : MutableValue
{
    public AnimatedValue (AnimationFragment initialFragment);
    internal override object GetValue ( );
    public Set (AnimationFragment newFragment);
}
```

The following example shows how to an Animated Value may be used in a scene graph:

```
AnimatedColor ac = new AnimatedColor (colorAnimationFragment);
...
drawingContext.DrawLine (ac, new Point (...), new Point (...), 1.0f);
...
```

AnimatedValues generally comprise a base value and a list of animation fragments. The base value is combined with the outputs of the animation fragments to come up with the final value that is passed to and through the parameterized scene graph. Note that fragments are only one way this may be accomplished.

With the "Set" function, the animated value can be set to a new animation fragment. Animation fragments may be considered objects that animate a value of a particular type (e.g., color) in a certain way, which may be constant. To set a constant in the animation value, the calling code uses a constant animation fragment, e.g., a constant color animation fragment for red would always have the value red. A more sophisticated function for an animated value may be provided to enable animation fragments to be combined.

In this manner, at any time the user can change the Animated Value, for example:

av.Set(newColorAnimationFragment);.

Figure 6:
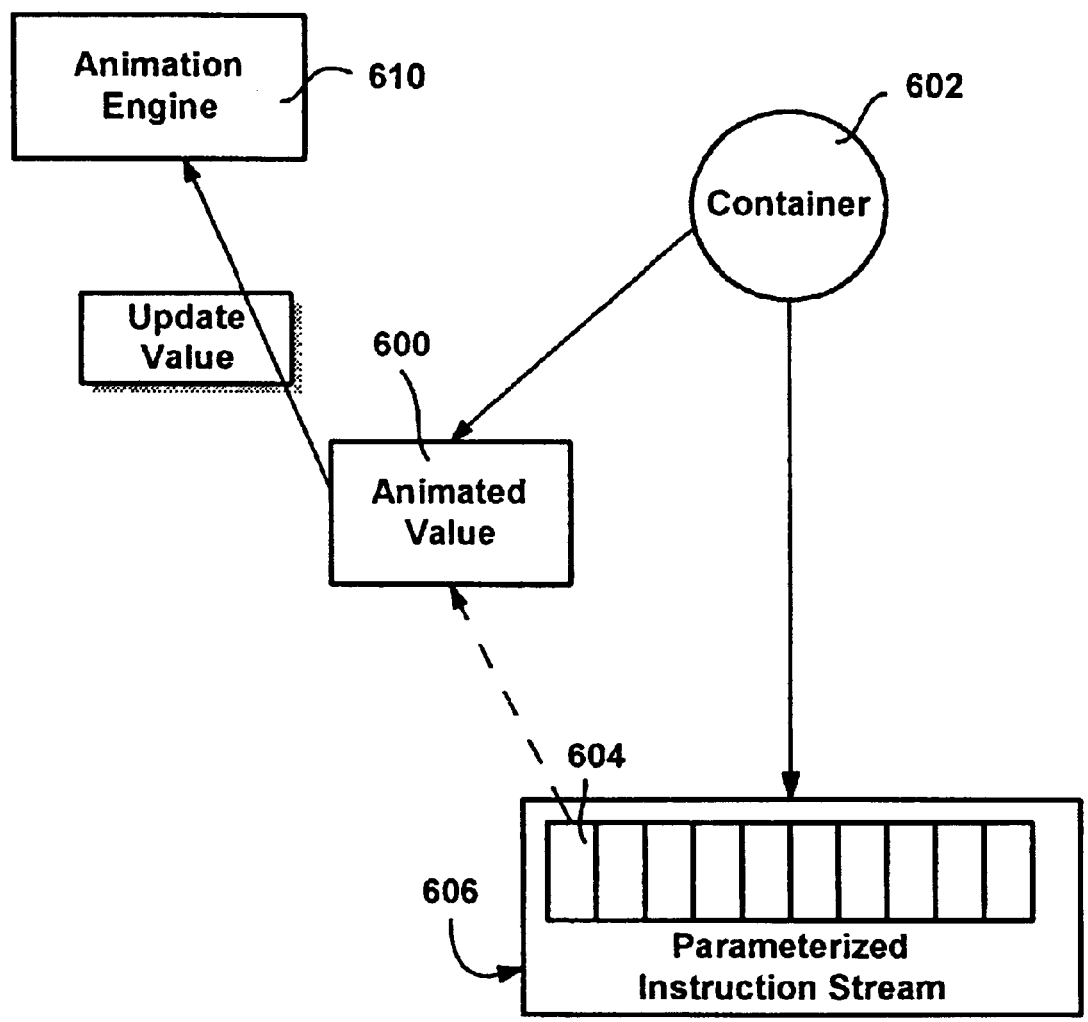
FIG. 6 is a block diagram generally representing the concept of an animated value in a scene graph in accordance with one aspect of the present invention.

As generally represented in FIG. 6, when an animated value 600 is first used to populate a particular graph container 602, a reference 604 to the animated value 600 is stored in (or in association with) the container 602 in a parameterized instruction stream 606. This reference is used to determine if a sub-graph is constant, i.e., the animated value does not change during a certain time period. In one current implementation this reference is also used to look up the value, as described below, wherein, for example, references in instructions may be represented with negative numbers or other suitable flag. The reference can also be used to manage the lifetime of an animated value. Further, the information that a sub-graph is constant may then be used to optimize the rendering process, as generally described below. A constant sub-graph may include having no mutable values in that sub-graph, or having no mutable values that are changing in an animated manner.

As is understood, mutable (animated) values are a generic mechanism for inserting hooks into a scene graph to perform modifications to the scene graph without recreating parts of the graph structure. By animating the scene graph via animated values, a clear separation between the scene graph and the animation engine 610 is provided. This is particularly beneficial in a system where scene graph changes are made in an asynchronous fashion, since mutable values can be used to synchronize changes to the animation binding with changes to the scene graph structure.

Figure 7:
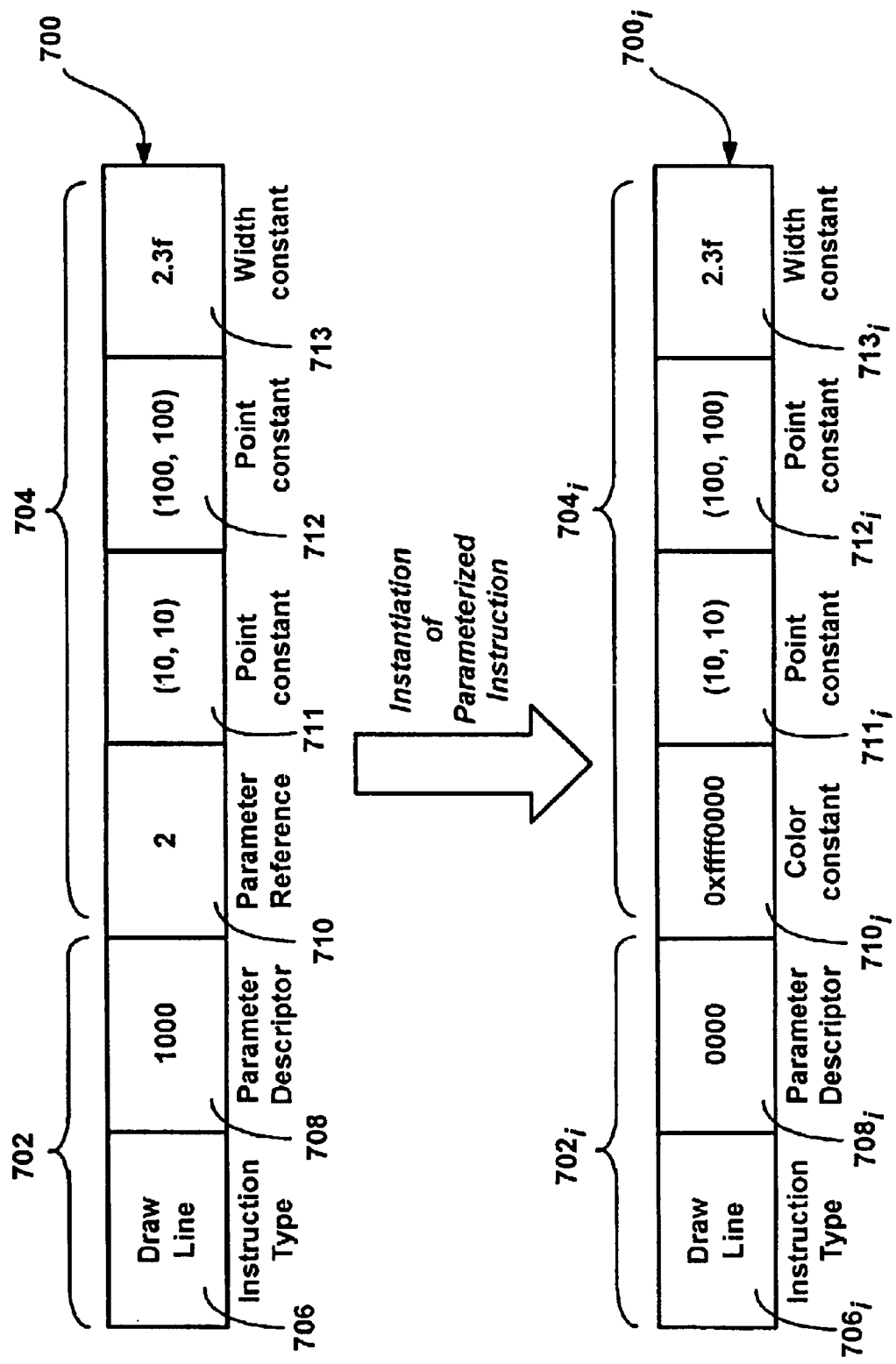
FIG. 7 is a representation of a parameterized instruction being instantiated into constant values for rendering in accordance with one aspect of the present invention

FIG. 7 represents one example implementation of a parameterized instruction. As described above, a primitive drawing operation on the drawing context creates a parameterized instruction 700 and adds it to the instruction stream currently opened in the drawing context (e.g., the drawing context 416 of FIG. 4). An instruction 700 comprises data in a memory, and may be considered logically separated into two parts, a header 702 and a body 704.

As represented in FIG. 7, the header 702 specifies the type of the parameterized instruction and which of its arguments are parameterized, via a bit field. The example in FIG. 7 shows a parameterized draw line instruction, as indicated by the "draw line" type field 706 and the parameter descriptor field 708. In the parameter descriptor field 708, the "1" bit in the "1000" binary indicates that the first parameter to the instruction (describing the color) in the parameter reference field 710 is parameterized, and thus has a value that needs to be obtained from elsewhere when needed at time of rendering. In the body 704, if a field is defined to be constant rather than variable via the bit field in the header, the constant is directly stored in the instruction 700. Thus, the other fields 711–713, representing the line's starting and ending points, and the width, which are defined as constant by the calling program code, (e.g., application), are stored in the body 704 of the pre-instantiated instruction 700.

If a parameter is not constant, (e.g., the StaticMutableValue as described above, or ConstantValue), then a parameter placeholder is stored instead of a constant. This parameter placeholder is an indirection that may refer to an index into a table of mutable values that is local to a subgraph, an index into a more globally scoped table of mutable values or perhaps a reference to a mutable value directly. To pass a constant to a MutableValue in, for example, a DrawLine instruction, this type to identifies values that are always constant.

In one implementation, two types of parameter placeholders include a placeholder for an animated value and a placeholder for a parameter reference. In this implementation, to differentiate between the different kinds of placeholders, negative numbers may be used for animated values and positive numbers for parameter references, although other ways of differentiating (e.g., with a separate indicator such as a flag) are possible.

As part of the rendering process that renders an instruction, the parameterized instructions are instantiated with the real values for each parameter placeholder. For example, as represented in the instantiated instruction $700_i$, (wherein when instantiated the various labels are denoted with a subscript "i"), during rendering the parameterized instruction in the field 710 is instantiated to a constant value in field $710_i$. The fully instantiated instruction $700_i$ is passed to the lower-level or device for rendering. Note that this is a relatively direct instantiation, and may include more complex processing.

To instantiate a parameterized instruction, methods to retrieve the value for a placeholder are provided. One method is for an animated value. In this method, the corresponding animated values are looked up in the immediate parent's graph container. Since negative numbers are used, (to differentiate from parameter references, the negative of the index is stored in the instruction), the absolute value is used to identify the stored animated mutable value stored. In other words, when a drawing operation on the drawing context is used with an animated value, a reference to that animated value is stored in a table referenced by the parent graph container. The index into this table for that animated value is then stored into the instruction. In the implementation wherein negative and positive numbers differentiate placeholders, if the value is negative, it indicates that the value can be looked up in the parent container's table. For example, the number is looked up to find the animated value, which is looked up to find the actual value (although other ways to find a value without such a double lookup may be implemented). Note that there are methods that may be used to optimize this table such that there is only one reference to any particular mutable value in the table.

In the case of a parameter reference, (e.g., stored as a positive integer in one current implementation), the value is looked up in the evaluation stack frame, as described below with reference to rendering. At present, it is noted that the lookup is a simple lookup in an array at the position of the parameter reference index. In the case of the present example, the index indicates position two (2), as indicated by field 710. Further, note that since there may be multiple tables which may be used when instantiating instructions, it is possible to use other data in the parameterized instruction to specify which table to use. For example, if there are multiple tables from which values may be selected, a bit field/enum may be used to specify to which table that index applies.

In addition to parameterized primitive instructions, the concept of hooking changeable entities into instruction streams may be applied to scene graph primitives, including transformation containers, and other containers such as those that change opacity, color, and many other special effects such as filters, explosions, image processing, sepia tones and so forth. For example, transformation containers transform the position/coordinates of sub-graphs below in some way, including offset, angle of rotation, size, and/or other ways. Note that a change in position may refer to a change in location on the screen, but also can include concepts such as changing an angle of rotation, size and/or virtually any function that varies any coordinate or coordinates. A mutable transformation container may appear as follows (although this class would be internal):

```
public class ParameterizedTransformContainer : TransformContainer
{
    public ParameterizedTransformContainer (MutableValue mv,
                                            GraphContainer [] children);
    ...
}
```

The following example shows how to use mutable transforms:

```
AnimatedTransform at = new
AnimatedTransform(transformationAnimationFragment);
drawingContext.PushTransform (at);
drawingContext.DrawLine (...);
...
drawingContext.PopTransform( );
```

By animating a parameterized transformation container via a transformation animation fragment, i.e., to transform the coordinates and/or other data in some way over time, the content in the sub-graph below a transformation container can be set in motion.

A constant value object is used to convert constants into mutable values, so that they may be handled internally in the same way animated values or reference parameters are handled, as described above. This also simplifies the functions by leveraging features of modern programming languages (e.g., C#), wherein the user can pass in constants. Note that in the table below, ConstantValue is an implicit converter that allows the user to simply call DrawLine(new AnimatedColorValue( . . . ), new Point2D (10, 10), . . . ):

```
public class ConstantValue : MutableValue
{
    public static implicit ConstantValue (Color color);
    ...
    internal override object GetValue ( );
    private object constant;
}
```

The draw line function on the drawing context may be changed to take mutable values as arguments:

```
public void DrawLine (MutableValue color,
                     MutableValue fromPoint,
                     MutableValue toPoint,
                     MutableValue width);
```

Note that the above function can be strongly-typed, by changing the prototype to public void DrawLine (MutableColorValue, MutablePoint2DValue, . . . ) the type system of modern programming languages may be leveraged, whereby internal type checking is not necessary since it is statically performed by the compiler during compile time. Note that this also changes the mutable value class hierarchy, e.g., instead of one mutable value, there may be multiple of the form Mutable<TYPE>Value, such as NutableColorValue.

Figure 8:
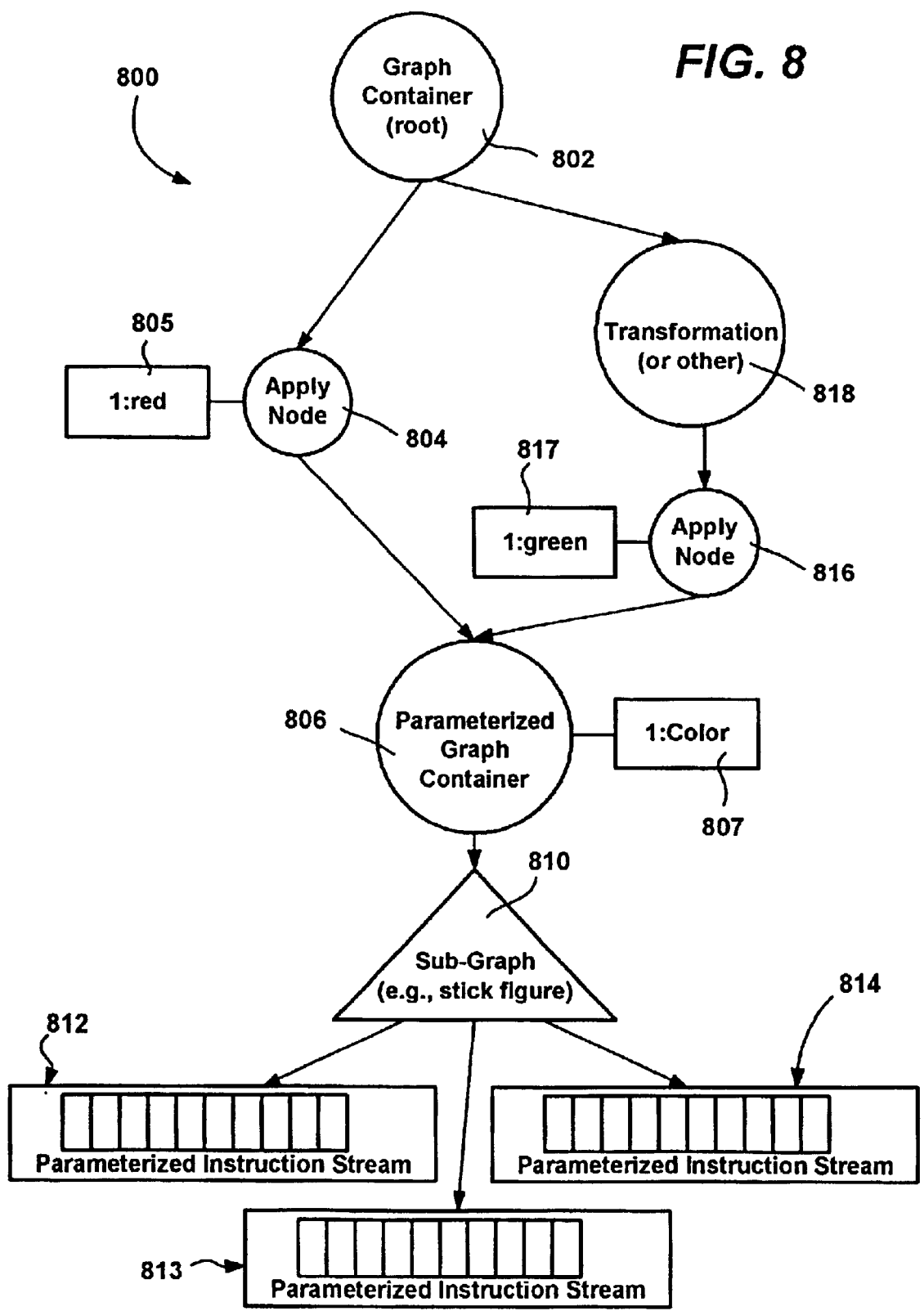
FIGS. 8 and 9 are block diagrams generally representing the concept and usage of parameterized graph containers in a scene graph in accordance with one aspect of the present invention.

In accordance with another aspect of the present invention, FIG. 8 shows an example scene graph 800 that uses a parameterized graph container. The root container 802 in FIG. 8 is an ordinary graph container having two children. The root container's left child is referred to as an apply node 804 that connects a parameterized graph container 806 to the root container 800. In the example represented in FIG. 8, the parameterized graph container 806 is parameterized over one argument of type color, (shown in the table 807). Note that the color type was chosen for simplicity; in an actual implementation, other types, such as some kind of brush type or a distance measurement, may instead be used.

The sub-graph 810 under the parameterized graph container 806 may reference the color parameter 807 of the parameterized graph container 806. For example, the sub-graph could describe a shape, such as a stick figure. Instead of defining a color for the stick figure's body parts, the instructions used to draw the stick figure reference the color parameter 807 of the parameterized graph container 806.

As described above, the parameterized instructions describing the stick figure are stored in parameterized instruction streams 812–814. The instructions streams include a parameter reference, as described above.

A parameterized graph container is essentially an extended graph container. However, in addition to the features of a normal graph container, a parameterized graph container stores for each parameter the type information, and also provides access functions to its parameters. The parameter access functions are used to get a reference to a parameter of the parameterized graph container, which can be passed to any primitive drawing operation. Note that an implementation of a parameterized graph container could derive from a normal graph container.

In one implementation, the parameterized graph container class is arranged as follows:

```
public class PGC
{
    public PGC (ParameterTypes [] parameterTypes);
    public MutableValue GetParameter(int parameterIndex);
    public DrawingContext Open ( );
    public void Close ( );
    ...
}
```

To create a parameterized graph container, a new object of type parameterized graph container is created. In one implementation, a parameterized graph container can be created with any number of parameters by passing an array of ParameterType values to the parameterized graph container constructor. The ParamterType specifies the expected argument type for each parameter of the parameterized graph container.

Figure 9:
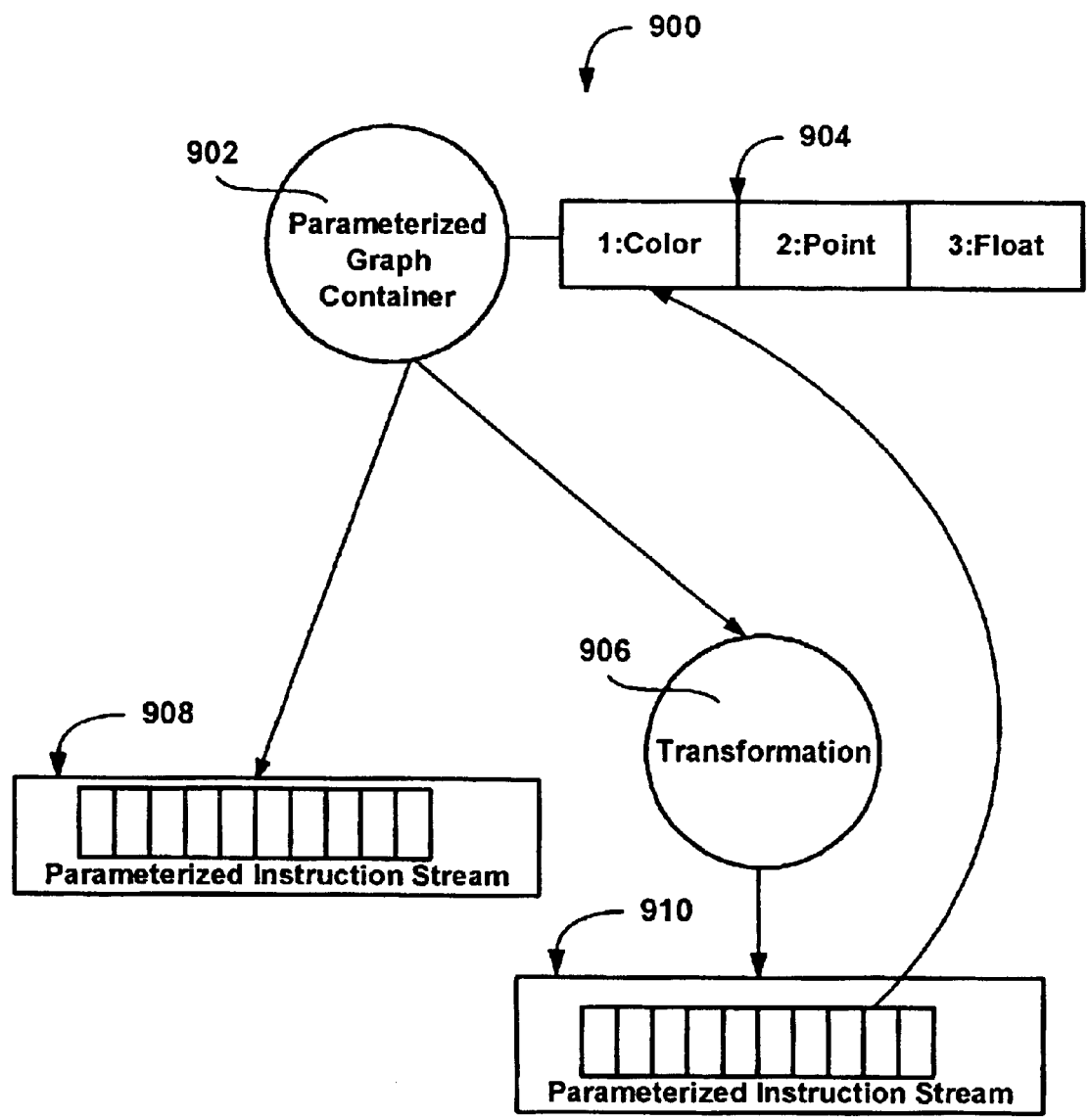

The example (in the top portion) of the scene graph 900 of FIG. 9 shows the creation of a parameterized graph container 902 with three arguments, such as via a suitable create command:

PGC PGC=new PGC (new ParameterType[ ] {Color, Point, Float});

As can be seen in FIG. 9, the parameterized graph container 902 expects as a first argument a color, as a second argument a point, and as a third argument a float. The argument types are typically stored inside the parameterized graph container (node) 902 in a parameter descriptor table 904, (although for clarity, as in other figures, the table 904 is represented as being outside the container in FIG. 9). The type information stored in the parameter descriptor table 904 may be used for type checking.

The types of the parameters are specified via the enumeration ParameterType:

```
enum ParameterType
{
    Color, Point, Float, ...
}
```

To reference parameters on a parameterized graph container, a GetParameter function on the parameterized graph container may be used. The GetParameter function returns an instance of a mutable value. The mutable value may be used in any drawing operation to reference the corresponding parameter. Note that if typed mutable values are used, there would be multiple Get<TYPE>Parameter functions, (e.g. GetColorParameter; which returns a MutableColorValue), one function for each type, or one generic function that returns an object that the user application would access. Having one function for each type is preferable from a verification perspective.

Parameters are addressed via an index. For example, as represented in the example of FIG. 9, the color parameter has an index of one (1), the point parameter an index of two (2), and the float parameter an index of three (3). Thus, the following example returns an instance of Mutable Value that describes the "point" parameter of the parameterized graph container in FIG. 9:

PGC.GetParameter (2);

Internally, the GetParameter function creates a ParameterReference, where ParameterReference is derived from MutableValue:

```
internal class ParameterReference : MutableValue
{
    internal ParameterReference (int parameterIndex);
    private int parameterIndex;
    private PCG owner;
}
```

Again, note that in the typed implementation, there may be typed versions of this class, e.g., ColorParameterReference, and so on. This typed version would inherit from MutableColorValue, and so on. Also note that this is another example for a mutable class, though it is only exposed internally and is not visible to the user.

The constructor API takes the parameter index and stores it. The parameter index is used to lookup the current value on a stack frame, and a GetValue( ) function returns the parameter index. The reference to the parameterized graph container that owns this parameter can be used to verify that the parameter is used only in the sub-graph of the parameterized graph container.

To populate a parameterized graph container, the same Open/Close transaction scheme used for normal graph containers is applied, although depending on the client application's requirements, this can be adjusted. The Open call returns the same drawing context that is returned from the Open call to a normal graph container:

```
DrawingContext ctx = PGC.Open( );
ctx.DrawLine (new Color ("red"),
            new Point (10, 10),
            new Point (20, 20), ...);
ctx.PushTransform(...);
...
```

In addition to constant arguments or animated values, a parameter reference can be passed to the drawing operations:

```
ctx.DrawLine (PGC.GetParameter (1),
            new Point (0, 0), ... );
...
ctx.PopTransform ( );
PGC.Close ( );
```

Once again, in an implementation using strongly-typed functions, a typed function is used, such as Get<TYPE>Parameter, e.g., GetColorParameter.

The apply node that connects the root container with the parameterized graph container 806 provides the parameterized graph container 806 with a value for its first parameter. By analogy, if a parameterized graph container is a defined function or subroutine, the apply node may be considered as a function call that provides the parameters. To provide the value or values, an apply node contains a table 805 of each argument passed to the DrawContainer function:

```
public class ApplyNode
{
    ...
    private PGC PGC;
    private MutableValue [] valueDescriptors;
}
```

During the rendering pass, the valueDescriptor is evaluated and the results are pushed onto a stack frame. In the example represented in FIG. 8, the apply node 804 passes the color red to the parameterized graph container 806.

In keeping with the present invention, having a separate node to provide parameters enables reusing the parameterized graph container 806 with different values for its parameters. In the example of FIG. 8, a second apply node 816 passes the color green from its table 817 to the parameterized graph container 806 for the stick figure. A rendering result of the example scene graph of FIG. 8 would be a first red stick figure at a first location, and second, green stick figure at a second location. Note that the transformation node 818 transforms the sub-graph's coordinates when the apply node 816 is rendered, causing the display of the second stick figure at the second location instead of at the first. As can be readily appreciated, such changes can be batched with other changes, so that, for example, thousands of such stick figures can change color (or shape, size, position and so forth) at the same time. Note that the node 818 can alternatively be some other type of node, such as an alpha node that changes opacity of the displayed image, or an effects node that provides a special effect or the like to the image.

FIG. 9 (as a whole) shows the graph created with the above instructions, including a transformation container 906 and parameterized instruction streams 908 and 910. The curved arrow from the parameterized instruction stream 910 to the parameter descriptor table 904 represents the drawline instruction referencing the first parameter (the color field) of the parameterized graph container.

Note that in the model of FIG. 9, only the immediate parameterized graph container 902 in the parent chain can be referenced. However, it is straightforward to extend the model to reference any parameter of any parameterized graph container in the parent chain. For example, one implementation may simply store a pointer to the referenced parameterized graph container. However, it should be noted that with such a model, the verification that determines whether a parameter reference is used correctly is less straightforward to implement, because some of the verification cannot be done during the graph building phase. Notwithstanding, an efficient verification algorithm would be simple to implement.

A parameterized graph container may be added to the scene graph by calling GraphContainer on the drawing context. The following example pseudocode shows how the parameterized graph container 902 represented in the example of FIG. 9 can be added to a scene graph below a transformation container:

```
DrawingContext ctx = rootContainer.Open ( );
ctx.PushTransform (...);
ctx.DrawContainer (PGC,
                   new Color (...),
                   new Point (...),
                   1.0f);
ctx.PopTransform ( );
```

Figure 10:
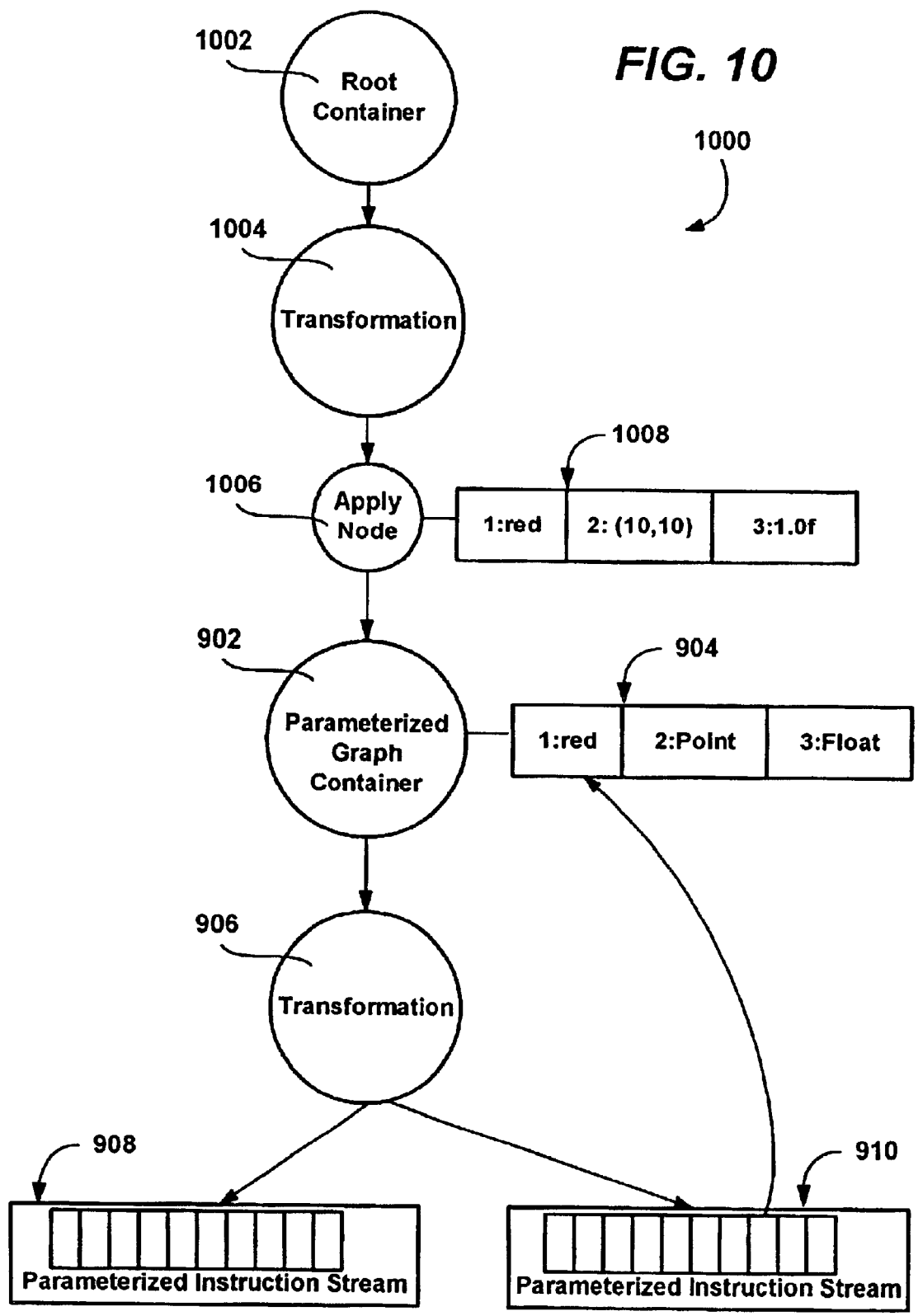
FIG. 10 is a block diagram generally representing the adding of a parameterized graph container to a scene graph in accordance with one aspect of the present invention.

FIG. 10 shows the resulting scene graph 1000 of the sample code. In FIG. 10, a root container 1002 is a parent of a transformation container 1004. An apply node 1006 is present between the transformation container 1004 and the parameterized graph container 902 to apply actual values in a table of arguments 1008 to the parameterized graph container's parameters, as verified by the parameter descriptor table 904.

A reference parameter of a parameterized graph container can also be passed to another parameterized graph container:

```
ctx.DrawContainer (PGC1,
                   PGC2.GetParameter (1),
                   new Point (...), ...);
```

The DrawContainer function on the drawing context can be typed as follows:
   public void DrawContainer(GraphContainer, params MutableValue[ ] parameters);

As described above, the high-level engine performs a rendering pass, which essentially comprises a walk over the scene graph. For rendering a parameterized scene graph, an evaluation stack frame is maintained. At the beginning of the rendering pass the evaluation stack frame is empty.

Every time the rendering pass reaches an apply node, the rendering pass creates a new stack frame that has the same size as the value descriptor table in the apply node. The evaluation stack frame is pushed on the evaluation stack. Then, for each entry of the value descriptor table of the apply node, the value is evaluated and stored on the stack frame at the same position that the value descriptor had in the value descriptor table in the apply node.

As described above, there are presently two different instances in which a value for each value descriptor table entry is retrieved, namely for parameter references and mutable values. For parameter references, the value is looked up on the second top-most evaluation stack frame at the parameter index stored in the parameter reference. The parameter index can be retrieved by calling GetValue on the parameter reference. For a mutable value, the constant is stored as a constant value.

In keeping with the present invention's efficiency, the intelligent caching mechanism of the high-level engine may attempt to use various mechanisms to reduce the consumption of resources, wherein resources generally include processor time and memory (in particular video memory) that are needed for rendering. Parameterized scene graphs also may be used with caching mechanisms of the intelligent caching mechanism. To this end, for example, the intelligent caching mechanism may recognize that a sub-graph is constant, whereby the intelligent caching mechanism may render the sub-graph as a bitmap, which can then be cached and reused. As another example, similar usages of a templatized sub-graph may use the same caches. Note that a cache could also be a tessellation of an image, such as the stickman, which is only resolution dependent but not necessary color dependent. In general, most of the caching mechanisms can also be applied with little change to a parameterized scene graph.

One way to extend the system is with an expression engine, and introduce another mutable value that binds expression into the system:

```
public class ExpressionValue : MutableValue
{
    public ExpressionValue (Expression expression);
    internal override object GetValue ( );
    private object expression;
}
```

The GetValue call returns the expression. During rendering, this expression is evaluated in the current context. If an expression is used multiple times, the evaluation of an expression can be cached on the expression itself, as long as changes are not allowed during a rendering pass.

One way to provide hit-testing in a parameterized scene graph is to track of the parameterization in a manner similar to the rendering algorithm. The parameterization can be extended so that hit-testing can be controlled per instance of a sub-graph reuse. To this end, in a scene graph with parameterized graph containers, in one implementation, hit-testing needs to return the whole path from root to the graph container, in order to uniquely identify what was hit. In an alternative implementation, this may be avoided by the use of a hit test node and hit test identifiers. Note that parameterized containers may be parameterized over hit-test identifiers, e.g., via a MutableHitTestContainer similar to the MutableTransformContainer.

Figure 11:
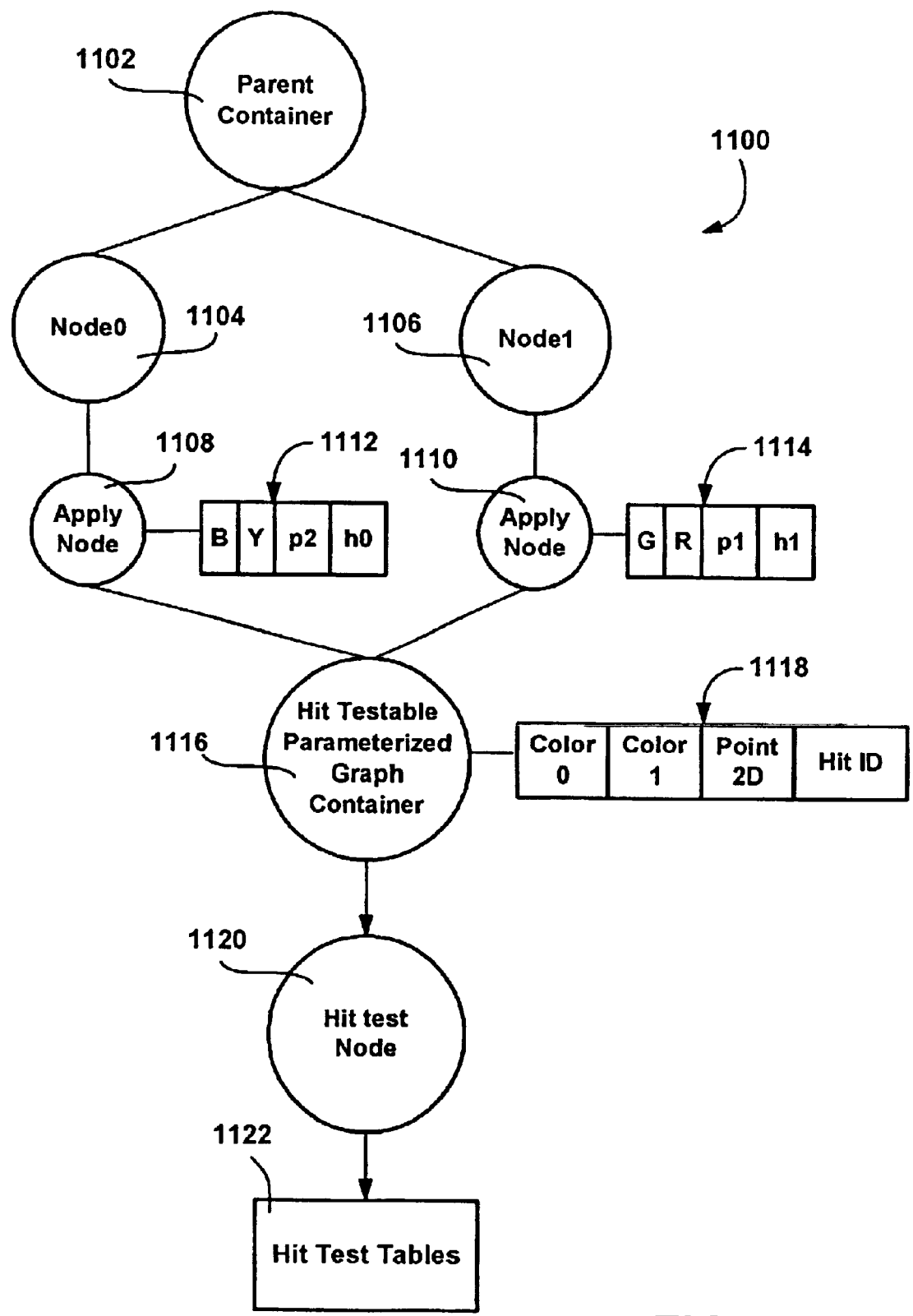
FIG. 11 is a block diagram generally representing a hit-testable parameterized graph container in a scene graph in accordance with one aspect of the present invention.

As generally represented in the example scene graph 1100 of FIG. 11, the system may be extended with a special hit-test node 1120 that is parameterized over a hit-test identifier. As a result, every usage of a parameterized sub-graph can use a different identifier by using parameterization over hit-test identifiers. In the example shown in FIG. 11, a parent container 1102 has two container nodes thereunder, Node0 (1104) and Node1 (1106). Each of these nodes has an apply node, 1108 and 1110, respectively, that apply two colors, a two-dimensional point and a hit test identifier to a parameterized graph container 1116. For example, one of the colors can represent the head of a stick figure and another color the rest of the stick figure body.

To provide efficient hit-testing, one of the arguments of the parameterized graph container 1116 is a hit test ID. The hit test node 1120 maintains hit-test tables relating each hit test ID to information about the node, e.g., path or binding information of the node. Note that this is only an optimization, which is not necessarily needed, as the graph is walked during hit-testing. In this manner, the information about content represented by the parameterized graph container 1116, as currently configured with one of the apply nodes, can be related to its hit test ID and related information. For example, if a number of stick figures are represented by the same sub-graph, via a parameterized graph container as described above, each one that is hit can be uniquely identified.

Thus, hit testing in general needs to be able to uniquely identify a node in the graph. Similarly, transformations, in combination with subgraph reuse, may require unique identifiers of nodes. For example, a transform can perform scaling (zoom by a factor), offsetting, rotating and so forth on one subgraph relative to another subgraph (which in turn may be relative to another). The present implementation can work with relative values of dimensions, locations, sizes and the like from one coordinate space to another coordinate space, such as to facilitate scrolling, hit testing, selection and so forth. However, when reuse is present in a scene graph, a unique identifier is needed to identify which instance of a reused node is being used as the basis for the relative transform. One solution is to use the path from the root to the sub-graph to the node to uniquely identify one usage of a parameterized graph container.

It is also possible to extend the system with parameterization over sub-graphs. The following Mutable Value enables this:

```
public class GraphContainerValue : MutableValue
{
    public GraphContainerValue (GraphContainer graphContainer);
    public SetGraphContainer (GraphContainer graphContainer);
    public static implicit operator
        GraphContainerValue (GraphContainer graphContainer);
    internal override object GetValue ( );
    private GraphContainer graphContainer;
}
```

To the drawing context the following function is added:
DrawGraphContainer(GraphContainerValue, params MutableValue [ ] parametes);.

The drawing operation inserts a special Apply Node that stores a reference to the GraphContainerValue. The rendering algorithm generally operates the same as it does for ordinary apply nodes, except that instead of taking the child of the apply node to continue rendering, the rendering algorithm obtains the child container from by calling GetValue on the GraphContainerValue stored on the special apply node.

Conclusion

As can be seen from the foregoing detailed description, there is provided a system, method and architecture that provide generic parameterization for a scene graph. The present invention provides numerous benefits relative to ordinary scene graphs, including efficient and flexible reuse of resources in a particular scene graph instance, via parameterization. Robustness is also achieved, as the present invention eliminates any need to run user code for parameterization during rendering. Other benefits include cache-compatibility, since because the parameterization is realized as intrinsic scene graph primitives, generic methods can be applied to optimize the rendering process. Scalable changes, including a distinction between structural changes and changes through the parameterization system, also provide benefits, in that a graphics system can be optimized such that parameterization changes are much faster and common relative to structural changes, which consume more resources but are relatively rare.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   providing an interface comprising a set of at least one function to a scene graph;
   receiving a request via the interface to include a mutable value in a container of the scene graph, the mutable value, having a value that is capable of being varied by another request received via the interface;

rendering the scene graph including providing graphics instructions corresponding to the scene graph, the instructions including data based on a current value of the mutable value;

queuing a new value; and receiving another request to vary the value of another mutable value, the other request including data corresponding to another new value for the other mutable value, queuing the other new value, and wherein rendering the scene graph includes dequeuing each new value and applying each new value to its respective mutable value.

2. The method of claim 1 further comprising, receiving a request to vary the value of the mutable value, the request including data corresponding to the new value for the mutable value.

3. The method of claim 1 wherein rendering the scene graph includes applying the new value to the mutable value such that the new value becomes the current value.

4. The method of claim 1 further comprising, receiving a request to return a current value of the mutable value.

5. The method of claim 1 wherein the rendering mechanism comprises a high-level component that executes at a first operating rate to provide the instructions to a low-level component, and further comprising, operating the low-level component at a second operating rate to provide drawing commands based on the instructions to a graphics subsystem, wherein the second operating rate is greater than the first operating rate and corresponds to a frame rate of the graphics subsystem.

6. The method of claim 1 wherein the mutable value corresponds to a position of content represented by the container, and further comprising, receiving a series of requests over time to vary the value of the mutable value, each request including data corresponding to a new position value for the mutable value.

7. The method of claim 1 wherein the mutable value corresponds to an appearance of content represented by the container, and further comprising, receiving at least one request to vary the value of the mutable value, each request including data corresponding to a new appearance value for the mutable value.

* * * * *